Patented Jan. 2, 1923.

1,441,100

UNITED STATES PATENT OFFICE.

ANDREW J. LEONARD, OF WEST BRANCH, MICHIGAN.

HAND-WASHING COMPOUND.

No Drawing.      Application filed September 19, 1921. Serial No. 501,736.

*To all whom it may concern:*

Be it known that I, ANDREW J. LEONARD, a citizen of the United States, residing at West Branch, in the county of Ogemaw and State of Michigan, have invented certain new and useful Improvements in Hand-Washing Compounds, of which the following is a specification, reference being had to the accompanying drawings.

This invention relates to a composition of matter and has for its object the provision of a novel compound paste designed for use in cleansing the hands, and at the same time softening and soothing them whereby to allay or prevent irritation, the compound being furthermore capable of use in eradicating stains and removing ink, paint, dirt and the like from fabrics even of delicate texture without causing injury thereto, the compounds containing elements which act more or less as germicides and which have a high penetrating quality so that the compound is capable of use in the treatment of sunburn, bruises, burns and various diseases of the skin.

With the above objects in view my invention consists in the combination of ingredients mixed or compounded as will be hereinafter described to form a paste which may be kept indefinitely if not exposed to the air and which will retain permanently its various qualities.

In carrying out my invention I first take a certain quantity of water, for instance 15 gallons, it being preferred that the water be soft, and place this water within a suitable vat together with 55 ounces of commercial lye. Heat is then applied and the water is boiled until the lye is dissolved, this action requiring approximately twenty minutes. To this solution I then add 22 pounds of clean, eatable beef suet or tallow and boil the mixture approximately one hour and twenty minutes with a slow heat, it being desirable to mix a certain quantity of water, practically about 3 gallons, into this boiling mass during boiling thereof for the purpose of replacing whatever water evaporates during the boiling so that the same quantity of material will always be within the vat. As this boiling is carried out the beef tallow absorbs a large percentage of the lye and of course saponification occurs. It is of course desirable that during the boiling the mass be constantly stirred or agitated, either manually or by any other means, so that all portions of the tallow will be exposed to the action of the lye.

I then place 6 pounds of potassium carbonate, preferably chemically pure, in a separate receptacle with a sufficient quantity of water and boil to effect dissolving. To this I add 3 pounds of clean, eatable mutton suet or tallow and boil until the ingredients dissolve. This dissolved mass is then added to the first vat together with 3 pounds of paraffine sealing wax. It is then necessary to add 3 gallons of hot water and to boil the entire mass for one and one-half hours over a comparatively hot fire whereupon the mass will foam and produce a white thick lather, and will become stringy like thick white syrup.

In a separate receptacle I then place 4 pounds of granulated sugar and sufficient water to melt the same and boil until the sugar is entirely dissolved. In this sugar and water solution I place 9 ounces of pure camphor gum and 9 ounces of powdered boric acid, preferably chemically pure, and boil the sugar solution with these ingredients until everything is dissolved. This mixture is then poured into the vat first referred to and boiling is continued for one and one-half hours while the mass is being constantly agitated or stirred. The above described steps in the process requires approximately five and one-half hours to accomplish and consumes about 25 gallons of water.

At this point I prefer to add 2 pounds of gasoline by weight and shortly thereafter the entire well boiled contents of the vat are poured into a mixing vat to cool. When the mixture is partly cooled and it starts to congeal to a certain extent, I start the mixing process which consists merely in stirring and agitating the entire mass with any suitable implement or by any suitable mechanical or other means. It is then preferred to add 4 more pounds of gasoline and 10 ounces of denatured alcohol together with 10 ounces of oil of mirbane. I also take 3 pounds of clean, eatable mutton tallow previously melted and mix in with the mass until a smooth white paste is produced. This proportion of ingredients when put together in the above described manner will produce 200 pounds of the finished product.

In use my compound is of course applied differently depending upon the purpose for which it is employed. The primary use is for washing the hands, it being possible to accomplish this with my paste without the use of water, the gasoline and potassium carbonate acting to remove any grease, oil or the like which might adhere to the skin. The sugar, alcohol, oil of mirbane, boric acid and camphor gum together with the gasoline, all combined, produce a powerful penetrating agent which is adapted to permeate the tissues of the body and to relieve pains of practically all kinds particularly soreness in the joints, rheumatic pains and bruises. The compound is equally well adapted for use for the treatment of sunburn, salt rheum, eczema, poison ivy, and the bites of insects and the like.

As a cleansing agent the compound is particularly meritorious as experience has proved that it is very effective in removing paint, tar, grease, dirt and the like from garments or fabric of any kind, even silk, without any injury. When the material is used for cleansing purposes the mutton tallow last placed in the mixture offsets the action of the lye whereby to prevent the latter from having too severe an action so that when the material is applied to the skin there will be no irritation whatever but instead there will be a soothing action and a tendency to heal and soften the skin. It is also to be noted that the alcohol and the oil of mirbane will serve to perfume the compound so that its use will be pleasing. It is to be also noted that the finished product is of a paste like consistency and will remain in such condition and retain its normal consistency for an indefinite period of time provided that it be sealed up in suitable containers whereby to be protected from contact with the air.

From the foregoing description it will be seen that I have provided a highly meritorious compound embodying a wide variety of ingredients which individually possess certain good qualities but which compounded in accordance with the carrying out of my process operate and coact to produce a true compound possessing unusual characteristics which render it adaptable for use for a wide variety of purposes.

While I have described certain proportions of the ingredients and certain successive steps in the combining and commingling thereof, it is to be understood that I reserve the right to vary the proportions within certain elements and to combine the elements possibly in different steps all such changes lying of course within the scope of the subjoined claims.

Having thus described my invention, I claim:

1. A composition of matter consisting of water, lye, and animal fat boiled and mixed to produce saponification, gasoline, denatured alcohol, paraffine sealing wax, potassium carbonate, sugar, camphor gum, powdered boric acid and oil of mirbane compounded in the relative proportions substantially as described.

2. A compound of the character described consisting of approximately 55 ounces of commercial lye, 28 pounds of animal fat, 6 pounds of potassium carbonate, 3 pounds of paraffine sealing wax, 4 pounds of sugar, 9 ounces pure camphor gum, 9 ounces of powdered boric acid, 6 pounds of gasoline, 10 ounces denatured alcohol, 10 ounces of oil of mirbane and sufficient water to make 200 pounds.

3. A composition of matter consisting of soft soap, a light hydrocarbon, paraffine, potassium carbonate, sugar, camphor gum, alcohol and boric acid compounded in substantially the relative proportions described.

In testimony whereof I hereunto affix my signature.

ANDREW J. LEONARD.